United States Patent [19]

Chung et al.

[11] Patent Number: 4,779,266
[45] Date of Patent: Oct. 18, 1988

[54] ENCODING AND DECODING FOR CODE DIVISION MULTIPLE ACCESS COMMUNICATION SYSTEMS

[75] Inventors: Fan R. K. Chung, Watchung; Martin Kerner, Maplewood; Mary G. O'Connor, Morristown; Jawad A. Salehi, Bedminster; Victor K. Wei, Morristown, all of N.J.

[73] Assignee: Bell Communications Research, Inc., Livingston, N.J.

[21] Appl. No.: 923,332

[22] Filed: Oct. 27, 1986

Related U.S. Application Data

[63] Continuation-in-part of Ser. No. 838,175, Mar. 10, 1986, abandoned.

[51] Int. Cl.[4] .................. H04J 3/24; G08C 19/00; H04B 9/00
[52] U.S. Cl. ........................ 370/93; 370/18; 370/19; 340/825.64; 340/825.76; 455/608
[58] Field of Search ............ 340/825.62, 825.64, 340/825.76, 825.73, 825.57; 370/19, 21, 18, 92, 93; 375/25, 68; 455/608, 603, 38

[56] References Cited

U.S. PATENT DOCUMENTS

| | | | |
|---|---|---|---|
| 3,496,546 | 2/1970 | Villafana | 340/825.64 |
| 3,715,508 | 2/1973 | Blasbalg | 370/19 |
| 3,906,348 | 9/1975 | Willmott | 340/825.62 |
| 4,281,409 | 7/1981 | Schneider | 370/19 |
| 4,426,662 | 1/1984 | Skerlos et al. | 455/603 |
| 4,442,550 | 4/1984 | Killat | 455/608 |
| 4,563,774 | 1/1986 | Gloge | 455/607 |

OTHER PUBLICATIONS

"Coding and Decoding for Code Division Multiple User Communication Systems", *IEEE Transactions on Communications*, vol. COM-33, No. 4, Apr. 1985, pp. 310-316, T. J. Healy.

*Primary Examiner*—Robert L. Griffin
*Assistant Examiner*—Andrew J. Telesz, Jr.
*Attorney, Agent, or Firm*—James W. Falk; John T. Peoples

[57] ABSTRACT

Methodology, and associated circuitry, for encoding and decoding signals utilize optimizing orthogonal code techniques that effect autonomy of communications and simplified signal processing, thereby improving reliability.

Encoder (121) processes an incoming data stream by associating an optimizing orthogonal code with each binary one in the input stream and then by transmitting a series of rate-increased pulses over a path during intervals determined by the code for each of the binary ones.

Decoder (131) is generally arranged as a correlation detector in that the decoder only responds to the particular optimizing orthogonal code for which it is configured. Sensors in energy transfer relation to the path are positioned at detection points on the path in correspondence to an assigned code. The outputs of the sensors are processed to produce a rate-decreased detected signal at the rate of the input stream whenever a rate-increased stream corresponding to the decoder configuration is propagating along the path.

16 Claims, 6 Drawing Sheets

ENCODING AND DECODING FOR CODE DIVISION MULTIPLE ACCESS COMMUNICATION SYSTEMS

CROSS-REFERENCE TO A RELATED APPLICATION

This is a continuation-in-part of application Ser. No. 838,175 filed Mar. 10, 1986, now abandoned.

The following U.S. application which is assigned to the same assignee as the instant application and is filed concurrently therewith, contains related subject matter: "Multiple Access Communication System", Ser. No. 923,328 of M. Kerner—M. G. O'Connor—J. A. Salehi.

FIELD OF THE INVENTION

This invention relates generally to digital communication systems and, more particularly, to circuitry and associated methodology for encoding and decoding signals to effect information interchange among a plurality of devices interconnected via a common wideband channel.

BACKGROUND OF THE INVENTION

Present day communication networks must generally serve end-users requiring a broad range of integrated (data/voice/video) services. For example, a large business with hundreds of employees and numerous host machines and communication needs for facsimile, high resolution graphics and video may require up to 1 gigabit/sec. transmission capability. This is in contrast to, for example, networks operating at speeds of 10 megabit/sec. for interconnecting terminals, intelligent workstations and personal computers to a large host or networks operating at speeds up to 50 megabit/sec. for interconnecting small numbers of large hosts To achieve this gigabit/sec. capability, network processing previously performed electronically, such as transmitting, switching and receiving, is now implemented with optical processing, and the networks are configured with optical devices such as laser transmitters, photodiode receivers and fiber optic cables.

In many conventional electronic systems, a socalled orthogonal code was utilized for encoding incoming signals and a receiver was configured as a so-called correlation detector. The signals propagating over the channel facility could be expressed in terms of voltage and current waveforms. In the voltage-current domain, it is possible to have negative as well as positive voltages and currents. Because of these two polarities, the overlap or projection of one pattern from the orthogonal code onto a different pattern from the code over a given time interval (basically a correlation operation) could be reduced to essentially zero. This allowed for an effective detection process by the receiver since a high correlation implied the signal on the channel matched the receiver configuration whereas a low correlation indicated the signal was not destined for the particular receiver.

In an optical system, signals on a channel are propagated by the presence or absence of light energy or photons, that is, information interchange is conveyed by the ON/OFF signal states; this is in contrast to the plus, minus and zero states of electronic systems In optics, there is no equivalent to negative values. Thus, conventional electronic orthogonal code processing techniques cannot be exploited in the optical domain (or, for that matter, in any domain having a zero state and only one non-zero state).

In a multiple user environment having only two propagation states, signal separation and, ultimately, signal detection are generally achieved by time or frequency division, that is, a time or frequency slot is dedicated to each user. This is oftentimes inefficient. If a system has a large number of users, butonly a relatively small fraction of the users are active at one time, then the so-called code division scheme may be useful. Two versions of this technique are discussed in the article entitled "Coding and Decoding for Code Division Multiple User Communication Systems", published in the *IEEE Transactions on Communications,* vol. COM-33, No. 4, April, 1985. Decoding in a code division system is processing time is dedicated to decoding, thereby reducing

SUMMARY OF THE INVENTION

The limitations and shortcomings of conventional techniques for encoding, transmitting and decoding information in a system supporting only two dignal propagation states are obviated, in accordance with the present invention, by methodology and corresponding circuitry for encoding and decoding the information with code patterns that engender the two-state equivalent of electronic orthogonal coding. These special code patterns are referred to as optimizing orthogonal codes.

Broadly, in contrast to offsetting positive states of a code with negative states of the code over a given time interval to mitigate correlation of different patterns from the code, optimizing orthogonal coding utilizes delay to minimize the projection of one code pattern onto another code pattern from the code. To introduce the delay dimension into the overall processing, each non-zero state emanating from a user or source controls a rate-increased stream of two-state signals called a signature pattern. Each source is assigned a particular signature. The channel signal comprises a composite of the propagating signatures from the various active sources. The sources need not be synchronized.

Each receiver is also assigned a preselected signature and is configured accordingly. In one illustrative receiver embodiment, signal taps are positioned along the channel in correspondence to the preselected signature. Whenever a particular source and receiver are in synchronism, and the preselected signature embedded in the composite channel signal is aligned with the taps, a threshold level in the receiver is exceeded, thereby indicating detection of the associated signature. The receiver also effects a rate-decreasing operation to restore the original information rate.

The organization and operation of this invention will be better understood from a consideration of the detailed description of the illustrative embodiments thereof, which follow, when taken in conjunction with the accompanying drawing.

DETAILED DESCRIPTION

Overview

Figure 1:
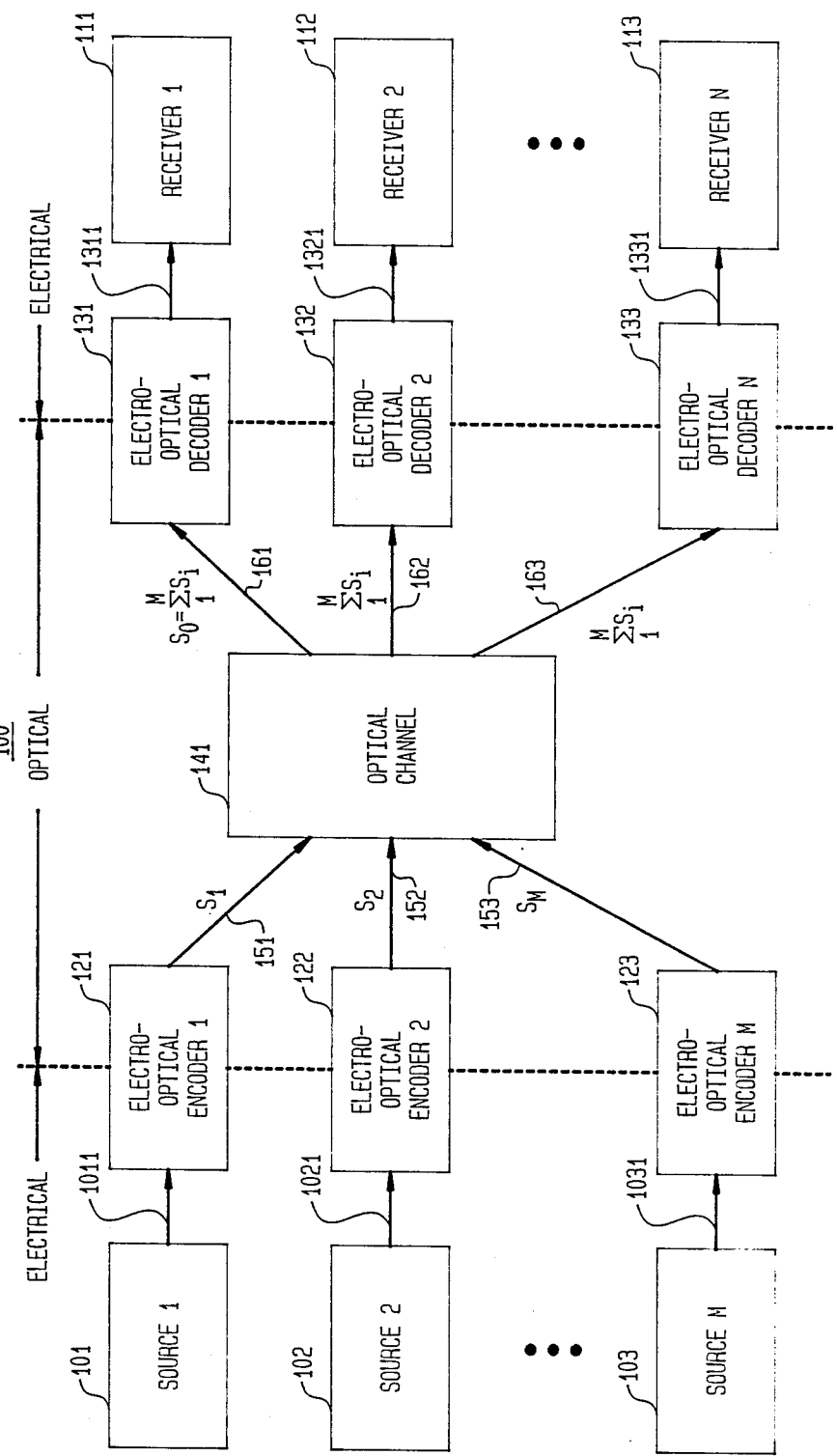
FIG. 1 depicts, in block diagram form, the electro-optical communication system under consideration in accordance with the present invention.

The general multiple user system 100 under consideration is depicted in block diagram form in FIG. 1. In system 100, M sources 101,102, . . . ,103 are arranged to communicate with N receivers 111,112, . . . ,113 over interposed optical channel 141. Sources 101-103 are coupled to channel 141 via electro-optical encoders 121-123, respectively. In addition, electro-optical decoders 131-133 serve to couple the channel signals to receivers 111-113, respectively. Each encoder 121, 122 or 123, besides performing an encoding function, also converts electrical input signals to optical output signals. Similarly, each decoder 131, 132 or 133, besides effecting a decoding function, is also arranged to convert optical input signals to electrical output signals. The optical portion of system 100 is shown generally as between the dashed lines that intersect, respectively, the encoder blocks and the decoder blocks.

Oftentimes system 100 is configured with more than one source but only one receiver; this is the so-called multiple access configuration. Alternatively, in the so-called broadcast mode, there is just a single source but many receivers. The encoding and decoding techniques in accordance with the present invention are applicable to the broadcast mode and the multiple access mode as well as the general configuration of system 100 in FIG. 1 since M and N may either be fixed over the life of the system or they may vary dynamically if required.

The channel under consideration, as exemplified by optical channel 141, is of the type that propagates only two-level or two-state digital signals, such as a logic zero (a "space") and a logic one (a "mark"). To match this channel characteristic, signals emanating from encoders 121, . . . ,123 on leads 151, . . . ,153, designated by signature signals $S_i, i=1, \ldots, M$, respectively, provide a stream of two-level or mark and space signals. Each $S_i$ stream corresponds to a similar stream produced by each source 101, . . . ,103, respectively, as discussed shortly. Since channel 141 only supports two-level signals, if one or more encoders 121-123 propagate logic one signals over channel 141 during the same time duration, the channel level remains a logic one. The channel level is logic zero if all the $S_i$ outputs, $i=1, \ldots, M$, are zero during the same time duration. In a logical sense, channel 141 behaves as an "inclusive OR" channel.

The composite signal on channel 141 due to all $S_i$'s is the superposition of all $S_i$'s and is represented by $$S_o = \sum_{1}^{M} S_i,$$

where the summation is treated in the inclusive OR sense. Each lead 161, . . . ,163 emanating from channel 141 in FIG. 1 serves as an input to and provides composite signal $S_o$ to decoders 131, . . . ,133, respectively. It follows from this description that all signatures $S_i, i=1, \ldots, M$ share substantially the same frequency band on channel 141.

Generally, each signature signal $S_i, i=1, \ldots, M$ is unconstrained in time in that each source 101, . . . ,103 may initiate a transmission or information interchange at any time, independently of the other sources. Thus, there is no requirement of synchronization between or among autonomous sources 101-103. However, each encoder 121, . . . ,123 is in synchronism with its corresponding source 101, . . . ,103, respectively.

Typically, one or more decoders 131, . . . ,133 are in synchronism with a predetermined encoder 121,122 or 123. For simplicity, it is assumed that there is a one-to-one synchronism relationship between, say, encoder 121 and decoder 131, encoder 122 and decoder 132 and so forth. An encoder may "train" the associated decoder using any of the well-known training techniques to provide the requisite synchronization. In addition, there is no required synchronization between or among autonomous decoders 131-133, but each receiver 111, . . . ,113 is synchronized with its associated decoder.

Figure 2:
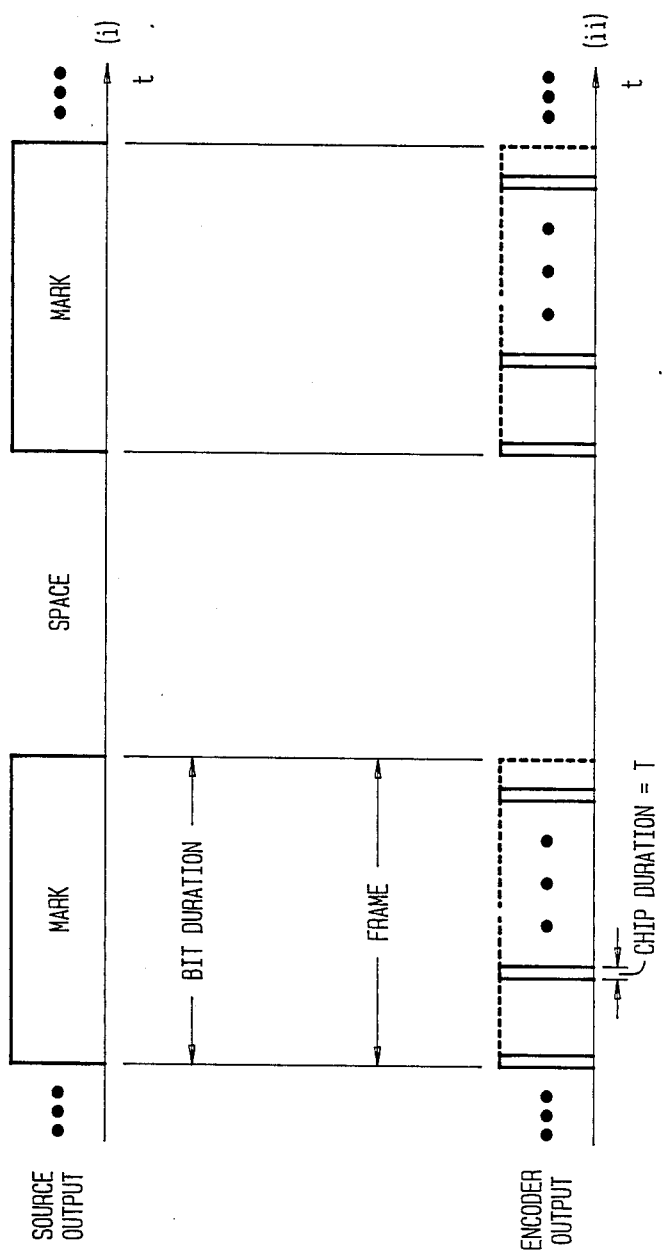
FIG. 2 depicts the relationship between the incoming electrical signal and the rate-increased optical signal propagated by any of the encoders of FIG. 1.

The primary function of each encode 121, . . . ,123 is that of converting each logic one received from each corresponding source 101, . . . ,103 to a predetermined rate-increased stream of logic ones and logic zeros, as depicted generically in FIG. 2. Line (i) in FIG. 2 depicts three contiguous data bits, namely, a "mark-space-mark" sequence appearing in the output stream of, say, source 101 or the input stream to encoder 121. The time interval of either a mark or space is designated as a bit duration.

Line (ii) in FIG. 2 represents an output pulse stream, say $S_1$ from encoder 121, corresponding to the line (i) input stream. As shown, a rate-increased stream of logic one and logic zero pulses, which is replicated for all other marks produced by source 101, is generated by encoder 121. Since channel 141 is, illustratively, an optical medium, the logic one levels in output stream $S_1$ correspond physically to light or photon pulses.

In the rate-increased or optical portion of system 100, a frame corresponds to a bit duration, and the time interval of a logic one light pulse or a logic zero (no light pulse) is designated the chip duration. Thus, each frame is composed of a fixed number of so-called "chips"; three logic one chips occur during each mark frame in FIG. 2. The envelope of the mark frames is shown by the dashed rectangles on line (ii) of FIG. 2.

In order to communicate effectively within system 100, each signature $S_i, i=1, \ldots, M$, as produced by its assigned encoder in response to an input mark, may not be selected arbitrarily, but must be carefully chosen to achieve efficient, error-free communication. This means basically that each $S_i$ must be selected in view of all the other $S_i$'s based on such considerations as number of sources M and the bandwidth of channel 141. These considerations, in turn, depend on the communication or system requirements or transmission characteristics. Sets of signatures $S_i, i=1, \ldots, M$ which realize optimal information interchange for a given number of chips and sources are discussed below.

The essential function of each decoder 131, . . . ,133 is that of discriminating within the composite signal $S_o$ the preassigned signature associated with each decoder 131, . . . ,133. In one illustrative embodiment, each decoder 131, . . . ,133 is implemented by optical tapped delay lines arranged along channel 141. The optical separation among taps for each decoder corresponds to the distribution of logic one chips in the signature preassigned to the decoder. Thus, whenever a mark is transmitted, each tap in a given decoder extracts a high-peak signal whenever the logic one chips in the preassigned signature propagating as part of $S_o$ are aligned with the taps. In this way, a so-called peak correlation manifests the arrival of the preassigned signature and, in turn, the propagation of a mark by the source having the same preassigned signature. A decoder illustrative of these principles is presented shortly.

The above overview description with reference to FIGS. 1 and 2 provides a basic framework for the principles of the present invention. The following sections elaborate on the details of illustrative embodiments, particularly those representative on encoders 121-123 and decoders 131-133.

Optimizing Orthogonal Codes

For clarity of exposition, it is helpful first to consider one particular example of optimizing orthogonal code sets in accordance with the present invention. The reason is two-fold, namely: it affords the opportunity to introduce terminology and notation and, in addition, provides a heuristic basis for the general encoding-decoding principles to be elucidated.

1. Heuristic Basis

Figure 3:
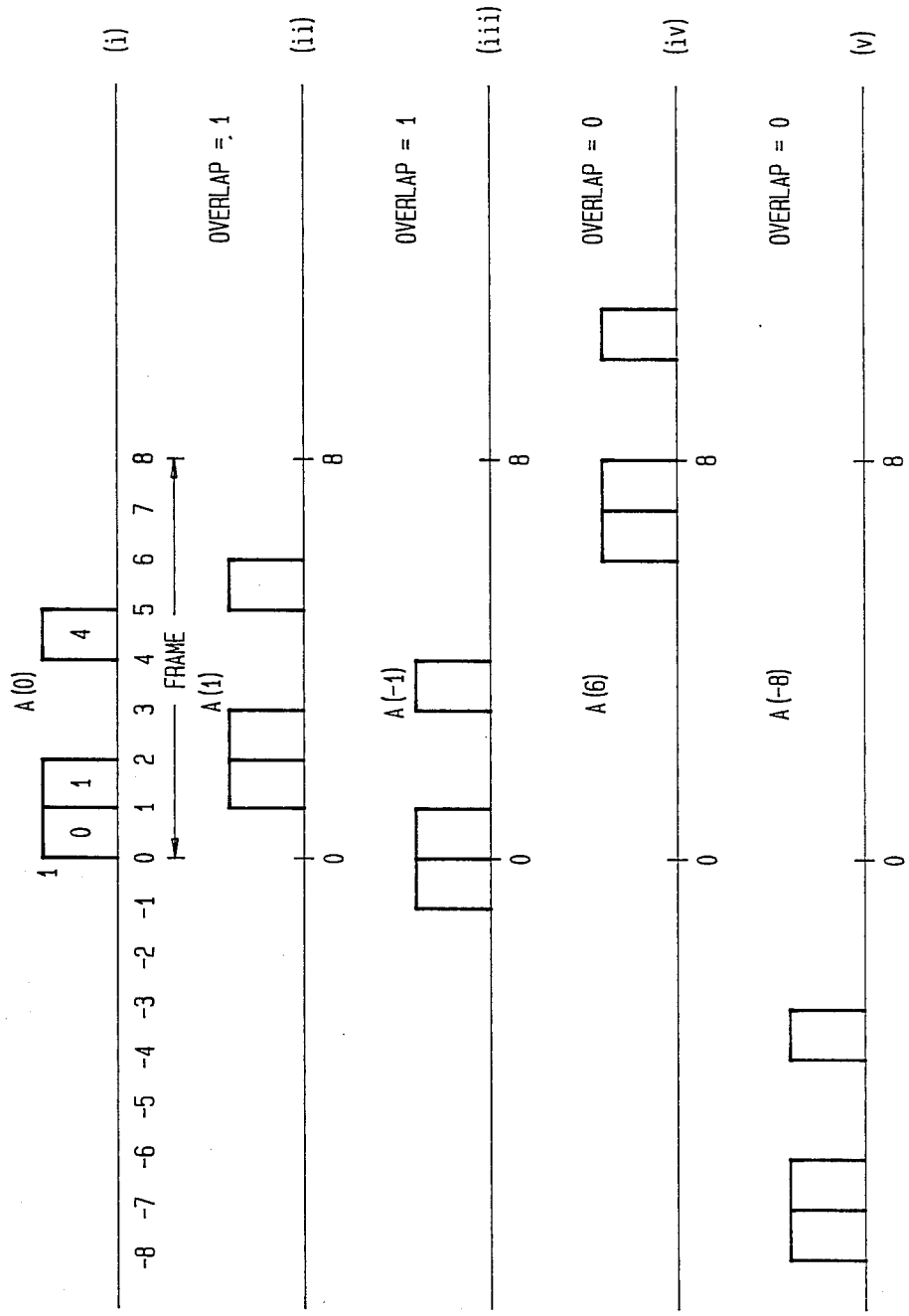
FIG. 3 illustrates the operation of shifting one code pattern relative to a fixed version of the same code pattern to produce the auto-correlation evaluation of the code pattern.

With reference to FIG. 3, the code pattern depicted on line (i) has non-zero entries for the intervals (0,1), (1,2) and (4,5). In general, there is the potential for eight code entries in the frame interval (0,8) and these entries are labeled by '0' for the (0,1) interval, '2' for interval (1,2), ..., and '7' for interval (7,8). For the code pattern of line (i), only entries '0', '2' and '4' are non-zero, and these are labeled accordingly. Code entries have the normalized height of one unit or a logic one level. The code pattern on line (i) is designated by $A(0)$.

Line (ii) of FIG. 3 depicts the same code pattern shifted one unit to the right and, therefore, is designated as pattern $A(1)$. Lines (iii), (iv) and (v) depict, respectively: a left-shift of one unit ($A(-1)$); a right-shift of six units ($A(6)$); and a left-shift of eight units ($A(-8)$).

In comparing line (i) of FIG. 3 to line (ii) of FIG. 2, it is realized that the code pattern $A(0)$ may represent one particular rate-increased signature $S_i, i=1, \ldots, M$, wherein such $S_i$ has a normalized chip duration of one unit and a normalized frame duration of eight units or eight chips. It is convenient then to continue the discussion on a normalized basis, realizing that denormalization may be readily effected.

Comparison of line (i) with line (ii) of FIG. 3 indicates that the code patterns "overlap", that is, have a common chip, only in the interval (1,2). Thus, $A(1)$ is said to overlap $A(0)$ in one position and this is tabulated on line (ii) as OVERLAP=1. Similarly, for lines (iii)-(v), the overlaps are given, respectively, by 1, 0, and 0. Hence, $A(-1)$ overlaps $A(0)$ in one position whereas $A(6)$ relative to $A(0)$ as well as $A(-8)$ relative to $A(0)$ have no overlaps. It is possible to vary the given code pattern from $A(-8)$ to $A(8)$ according to the scheme $A(-8), A(-7), \ldots, A(0), \ldots, A(8)$ and evaluate the overlap relative to a fixed $A(0)$; when this is accomplished, the following truncated sequence or array of seventeen OVERLAP values is generated: $R_A = \{0,0,0,0,1,1,0,1,3,1,0,1,1,0,0,0,0\}$. The maximum value of the elements of $R_A$ is three and it occurs when $A(0)$ is evaluated relative to $A(0)$. Also, no other element value is greater than one.

By way of terminology, an auto-correlation evaluation is defined as the operation of shifting a code pattern across a stationary version of the same code pattern to form the truncated sequence of overlap values. As exemplified above, the auto-correlation evaluation of $A(0)$ yields $R_A$. To simplify further, the notation $A \boxtimes A = R_A$ is used to indicate that the auto-correlation of the code pattern $A(0)$ yields $R_A$.

To generalize these principles, it is supposed that a code pattern, designated S, has w non-zero entries. Then $S \boxtimes S$ yields $R_S$ having elements such that the maximum value of the elements in $R_S$ is w, or max $(R_S)=w$. (From above, max $(R_A)=3$, as expected for $A(0)$). The values of the remaining elements of $R_S$ are not immediately apparent since, in general, the specific code pattern S must be known to form the specific $R_S$. However, it is possible to generate certain code patterns so that all other element values are either zero or one while still retaining max $(R_S)=w$. (From above, the code pattern $A(0)$ exhibits these characteristics). These special code patterns are fundamental to the present invention.

The significance of these codes resides in the fact that they ensure maximum separation for signal detectability within a decoder. For instance, with reference to FIG. 1, let $S_1 = A(0)$ and suppose only $S_1$ is propagating over channel 141, that is, $S_o = S_1 = A(0)$ for each frame. Then, if any decoder 131, ..., 133 is connected to channel 141 with tap positions corresponding to the non-zero code entry locations of $A(0)$, that is, three taps wherein the second and third taps are spaced apart two and three chip durations, respectively, following the first tap, then the three taps will simultaneously sense different propagating photons during one and only one chip duration and thereby provide a cumulative signal level of w=3 in the detector. This corresponds, in effect, to evaluating the overlap of $A(0)$ relative to $A(0)$. During all other chip intervals, at most one tap will sense a chip pulse (corresponding to evaluating the overlap of $A(k)$ relative to $A(0)$ for $k=-8, -7, \ldots, -1, 1, \ldots, 7, 8$). A threshold device in the given decoder could be set at, say, a normalized level of 2 units and a threshold crossing would indicate a signature has been received by the decoder.

It was presumed in the above discussion that during an auto-correlation evaluation, shifts occurred in unit intervals so, for instance, $A(\frac{1}{2})$ was undefined. In a system implementation, effects of non-unit shifts are precluded due to system synchronization as described shortly.

Although the auto-correlation property of certain codes provides a significant difference between the maximum value and all other values in the OVERLAP array, it is equally important for a multiple source system that an additional property be exhibited by the code patterns. To demonstrate this property, reference is made to FIG. 4. In line (i) of FIG. 4, the same $A(0)$ code pattern studied in FIG. 3 is repeated here for ready reference. A second code pattern, designated $B(0)$, is shown on line (ii) of FIG. 4. In the same manner as discussed above, it is possible to evaluate the overlap of $B(0)$ with $A(0)$, which yields OVERLAP=1 as tabulated on line (ii). Again, it is possible to shift $B(0)$ either left or right from $-8$ to $+8$. Lines (iii)-(v) depict $B(-8)$, $B(-7)$ and $B(3)$, respectively, with corresponding OVERLAPS of 0, 1, and 0 relative to $A(0)$. When $B(0)$ is fully shifted from left to right relative to $A(0)$ and the corresponding overlap values collected to form a truncated sequence $R_{BA}$, then $R_{BA}$ has the following elements:

$$R_{BA} = \{0,1,1,0,0,1,1,1,1,1,0,1,0,0,0,0\}.$$

It is noted that max $(R_{BA}) = 1$ and the elements of $R_{BA}$ are either 0 or 1.

Again, by way of terminology, a cross-correlation evaluation is defined as the operation of shifting one code pattern of a given frame duration across another stationary code pattern of the same duration to form the set of overlap values. As exemplified above, the cross-correlation of B(0) relative to A(0) yields $R_{BA}$. To simplify further, the notation $B \boxtimes A = R_{BA}$ indicates the cross-correlation of code pattern B(0) with A(0). It is easy to show that $A \boxtimes B = R_{AB}$ wherein the elements of $R_{AB}$ are interchanged versions of $R_{BA}$ such that the first element of $R_{BA}$ becomes the last element of $R_{AB}$, the second element of $R_{BA}$ becomes the second-last element of $R_{AB}$ and so forth. In either case, the cross-correlation yields a maximum overlap of one chip.

The significance of the cross-correlation property of these special code patterns lies in the fact that they mitigate interference during the signature detection process. For instance, with reference to FIG. 1, let $S_2 = B(0)$ and suppose only $S_2$ is propagating over channel 141, that is, $S_o = S_2 = B(0)$ for each frame. Then, if any decoder 131, . . . , 133 is connected to channel 141 with tap positions arranged to detect A(0), then at most one decoder tap will sense propagating photons during each chip duration. This corresponds to evaluating the overlap of B(0) relative to A(0). Thus, a threshold device set to a normalized level of 2 units in the decoder would not detect a threshold crossing and, consequently, the propagating B(0) signature is not detected by the A(0)-arranged decoder.

2. Illustrative Embodiments

Figure 4:
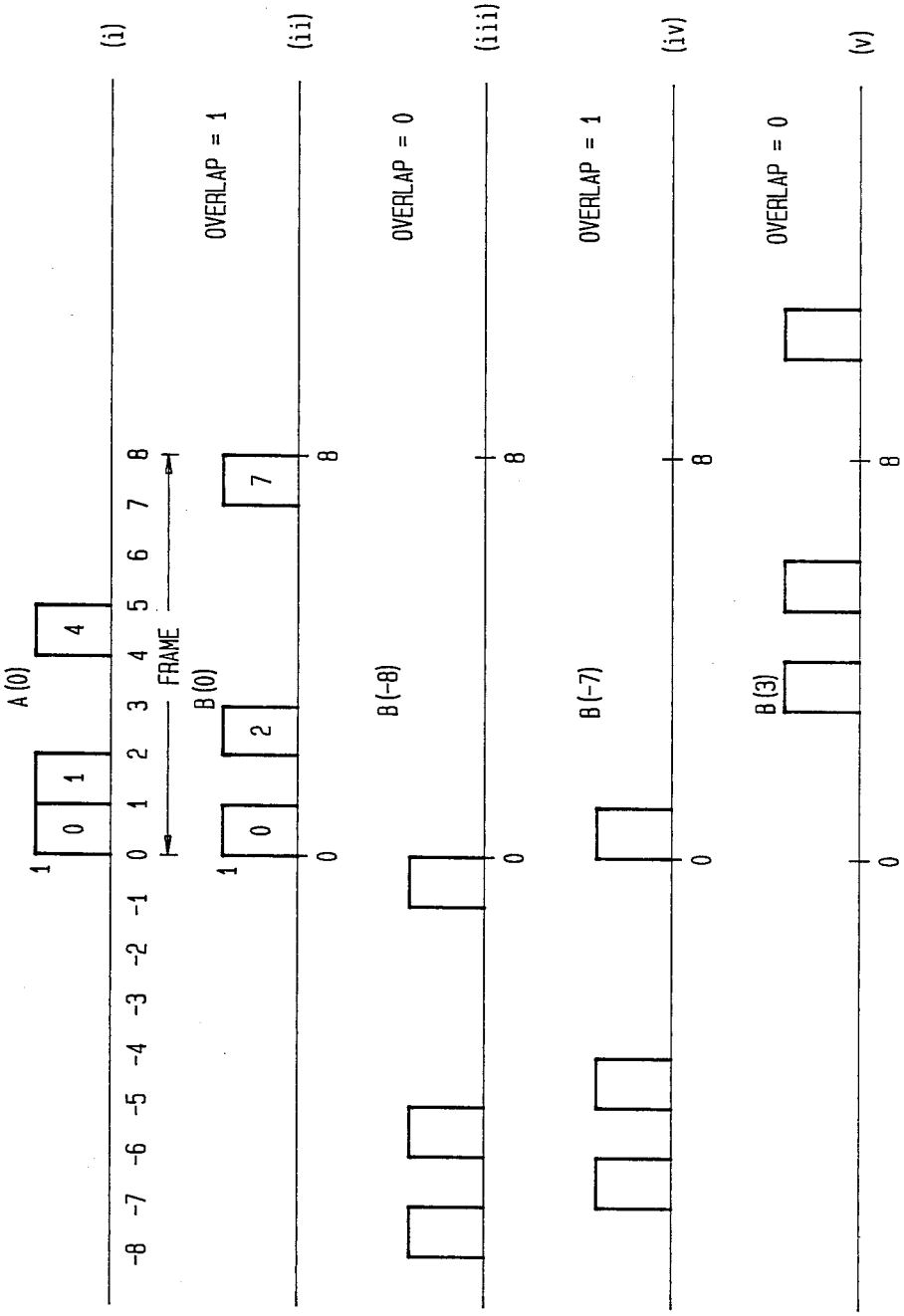
FIG. 4 illustrates the operation of shifting one code pattern relative to a second, fixed code pattern to produce the cross-correlation evaluation of the two code patterns.
Figure 5:
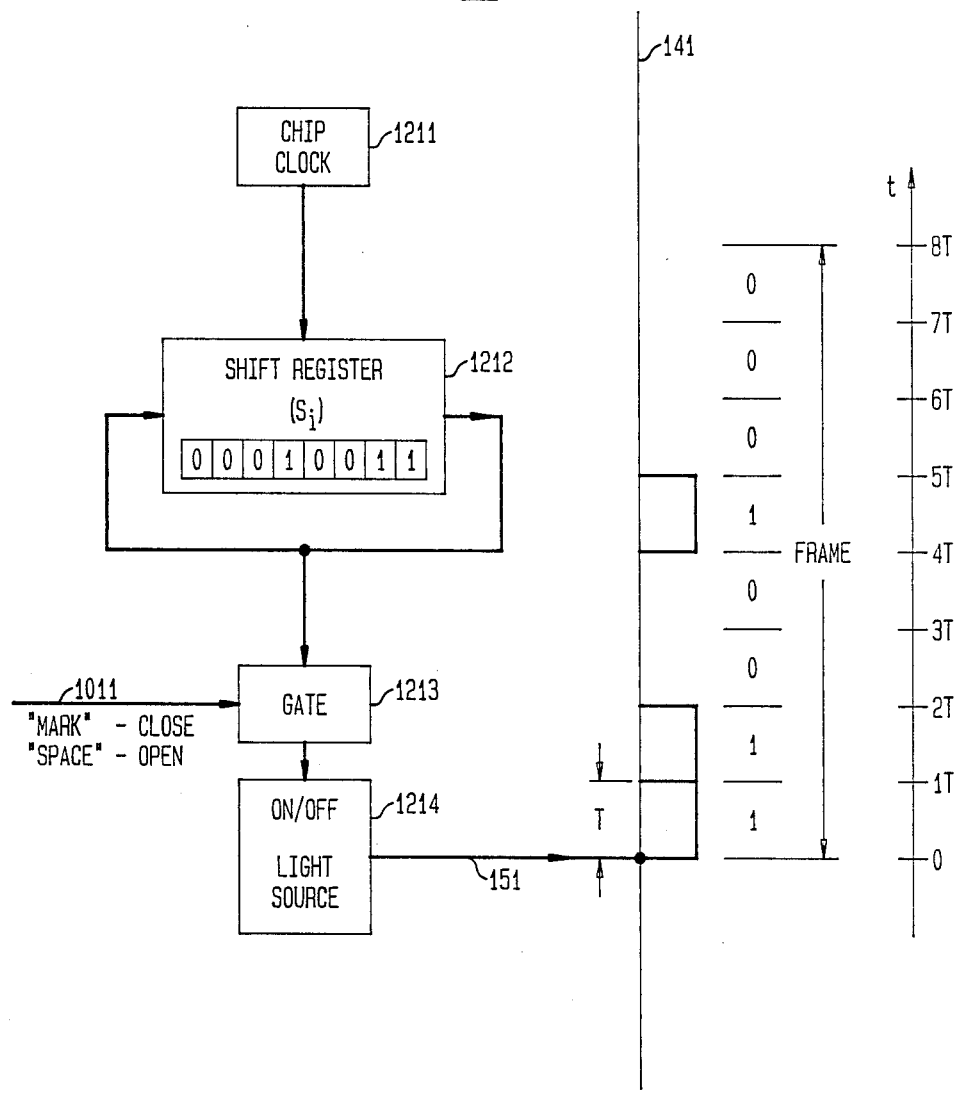
FIG. 5 is a block diagram depicting an encoder illustrative of the present invention.

In order to propagate the types of code patterns exemplified by FIGS. 3 and 4 over channel 141 of FIG. 1, one implementation for any encoder 121, 122 or 123, say encoder 121, depicted in block diagram form in FIG. 5 may be utilized. Chip clock 1211 is free-running and outputs a pulse stream at the chip rate 1/T (T being the chip duration). Clock 1211 drives shift register 1212 and causes register 1212 to recirculate its stored bits. The bits shown as illustrative of the contents of register 1212 represent A(0) of the previous subsection. The circulating bits serve as one input to AND gate 1213. The second input to gate 1213 is provided by lead 1011 emanating from source 101 of FIG. 1. Only a logic one or mark on lead 1011 causes gate 1213 to replicate the bits stored in register 1213 at the output of gate 1213, thereby providing the ON/OFF control of light source 1214. Lead 151 couples light source 1214 to channel 141. As depicted in FIG. 5, light pulses will be produced in the time periods between (0,T), (T,2T) and (4T,5T), corresponding to the A(0) code pattern.

Figure 6:
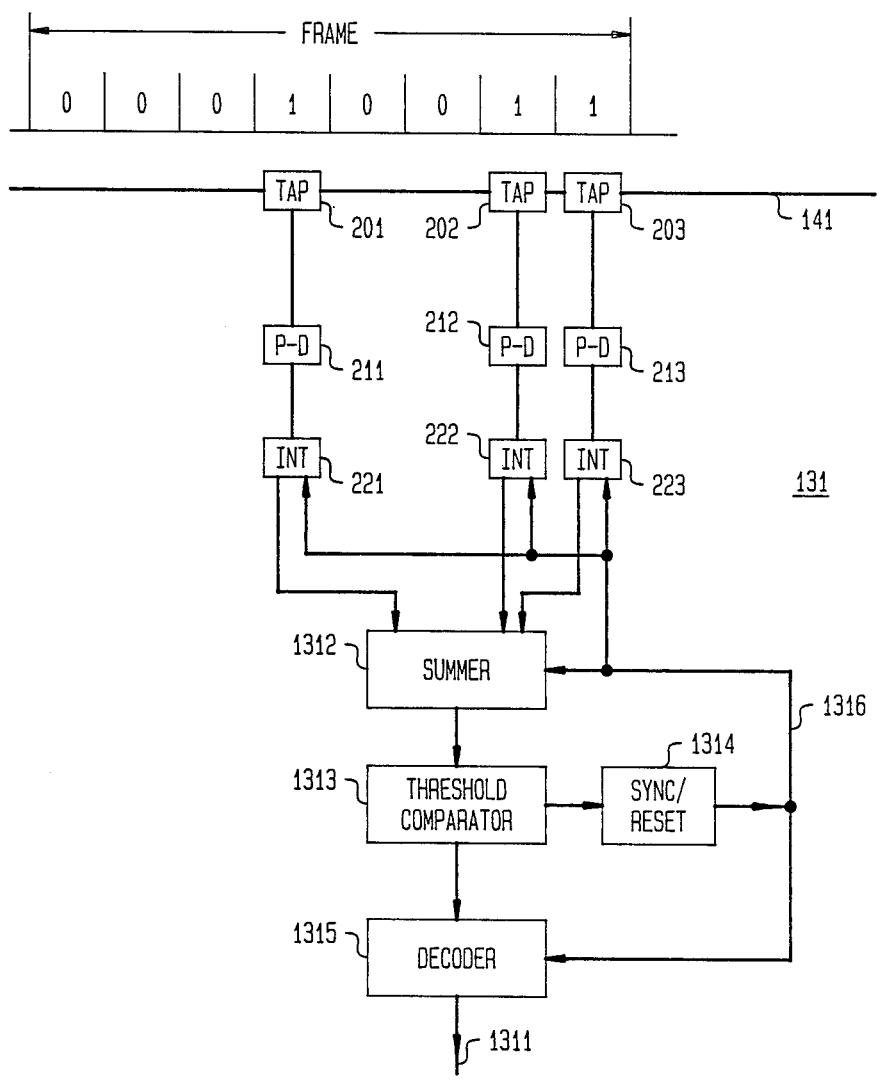
FIG. 6 is a block diagram depicting a decoder illustrative of the present invention.

To detect the types of code patterns propagating on channel 141 of FIG. 1, one implementation for any decoder 131, 132 or 133, say decoder 131, as depicted in block diagram form in FIG. 6 may be utilized. The description that follows assumes that the particular decoder is in synchronism with its associated encoder. Again, this is accomplished via the well-known technique of providing a "training" session prior to the transmission of any actual data.

Taps 201-203 on channel 141 are positioned according to the time distribution of the preassigned code pattern. For instance, if decoder 131 is arranged to detect the A(0) pattern, taps 202 and 203 are spaced apart 2T and 3T seconds in time, respectively, from tap 201, or in terms of optical length, the distance traveled by a pulse in 2T and 3T seconds. The positioning of the taps relative to an A(0) frame during one instant of the detection process is illustrated by the FRAME time diagram above channel 141 in FIG. 6.

Taps 201-203 feed corresponding optical photo-detectors 211-213 and the individual outputs of these photo-detectors serve as inputs to integrators 221-223, respectively.

A channel signal $S_o$ on channel 141 having an embedded code pattern corresponding to the tap positions generates a detectable signal at the output of each photo-detector for the chip duration. Each corresponding integrator sums the output of the photo-detector for a prescribed time interval, typically the chip duration. The outputs of integrators 221-223 are combined via summer 1312. This accumulated signal is then provided to threshold comparator 1313 for comparison to a predetermined threshold. In terms of the previous discussion, if detector 131 is arranged to detect A(0) patterns, then the appearance of an A(0) frame in $S_o$ simultaneously provides a normalized signal of one unit at the end of the integration period from each integrator 221-223, respectively. Accordingly, summer 1312 registers a three unit output, and if the threshold is set to a normalized value of two units, the detection of this mark frame in comparator 1313 is indicated by enabling decoder 1315. Decoder 1315 performs a rate-decreasing operation to restore the original data rate. Each time decoder 1315 is enabled, lead 1311 registers a logic one at the original data rate.

If, however, the channel signal $S_o$ is composed of only B(0), then only one integrator per chip duration senses an overlap and the summer never exceeds one unit. Thus, comparator 1313 provides a logic zero to lead 1311.

It is apparent that integrators 221-223 and summer 1312 should be reset at the beginning of each chip duration. This reset operation is controlled by sync/reset circuit 1314, via lead 1316, in the usual manner for electronic correlation-type detectors. Furthermore, circuit 1314 maintains encoder-decoder pair synchronism via an initial training session. Frame synchronization is supplied to decoder 1315, also via lead 1316 from circuit 1314.

3. General Code Properties

In the preceding sections, certain generalized properties were introduced during the discussion of the correlation evaluations. These properties are now formally defined.

A $(n, w, \phi_a, \phi_c)$-optimizing orthogonal code C is a family of (0,1)-sequences of length n which satisfies the following two properties:

(i) the auto-correlation property:

$$\sum_{t=0}^{n-1} x_t x_{t+m} \begin{cases} \leq \phi_a, & \text{for any } X \text{ contained in } C \\ & \text{and } m \text{ an integer,} \\ & 0 < m < n; \\ = w, & \text{for any } X \text{ contained in } C \\ & \text{and } m = 0; \end{cases}$$

(ii) the cross-correlation property:

$$\sum_{t=0}^{n-1} x_t y_{t+m} \leq \phi_c, \quad \text{for any } X \neq Y \text{ contained in } C \text{ and any integer } m.$$

The auto-correlation property implies that each n-tuple $X=(x_0, x_1, \ldots, x_{n-1})$ in C has weight w, that is, it has exactly w 1's. The subscripts of the x's and y's in the correlation equations are reduced modulo n, but the summations and the multiplications in the calculation of the correlations are done in the real field (i.e., they are not reduced by any modulus). The numbers $\phi_a$ and $\phi_c$ are the auto-correlation and cross-correlation constraints. The (0,1) sequences of an optimizing orthogonal code are called its code word (for example, X or Y). The size of an orthogonal code, denoted $|C|$, is the number of code words in it. Since each code word has weight w, the auto-correlation of any sequence for $0 < m < n$, and the cross-correlation between any two sequences for any m are necessarily less than or equal to w.

As an example illustrating these properties, the A(0) and B(0) signatures from the previous section are actually two sub-patterns from a (13,3,1,1) orthogonal code. (A(0) and B(0) are sub-patterns since the actual frame duration for this code is 13 chips; in FIGS. 3 and 4, only the entries through the eighth chip duration were considered to reduce the complexity of the discussion). In formal terms, $S_1 = \{0,1,4\}$ and $S_2 = \{0,2,7\}$ form an orthogonal code (13,3,1,1) with two code patterns or signatures.

It is desirable to have a large optimized orthogonal code in order to support information interchange among numerous sources. For a given set of values n, w, $\phi_a$ and $\phi_c$, the largest possible size of an $(n,w,\phi_a,\phi_c)$-orthogonal code is denoted by $\theta(n,w,\phi_a,\phi_c)$. An optimized orthogonal code having the maximum size is said to be maximal. The TABLE lists some maximal codes for various values of n, but with w fixed at three and $\phi_a$ and $\phi_c$ equal to one, that is, $\theta(n,3,1,1)$:

TABLE

| n | $\theta(n,3,1,1)$ |
|---|---|
| 13 | {0,1,4},{0,2,7} |
| 19 | {0,1,5},{0,2,8},{0,3,10} |
| 25 | {0,1,6},{0,2,9},{0,3,11},{0,4,13} |
| 31 | {0,1,7},{0,2,11},{0,3,15},{0,4,14}{0,5,13} |

One method to generate the codes contained in this TABLE is given in APPENDIX 1. A program and an algorithm for generating other optimizing orthogonal codes for fixed $\phi_a = \phi_c = 1$ and variable n and w are given in APPENDICES 2 and 3.

It is to be further understood that the electro-optical encoders and decoders, including associated methodologies, described herein are not limited to specific forms disclosed by way of example and illustration, but may assume other embodiments limited only by the scope of the appended claims.

APPENDIX 1

For n = 6t + 1, an optimal (n,3,1,1)-optimizing orthogonal code is constructed. There are t code word-sets of the form $S_i = \{0, i, t + i + x_i\}$ where the $x_i$'s are specified in four cases, depending on the value t mod 4.

Case 1: t = 4k, k ≥ 2, $$x_i = \begin{cases} 2k-j, & i = 2j, \quad 1 \leq j \leq 2k-1 ; \\ 6k-1-j, & i = 2j+1, \quad 1 \leq j \leq k-2 ; \\ 6k-j, & i = 2j+1, \quad k \leq j \leq 2k-1 ; \\ 2k, & i = 4k ; \\ 4k, & i = 2k-1 ; \\ 7k-1, & i = 1 . \end{cases}$$

Case 2: t = 4k + 1, k ≥ 2, $$x_i = \begin{cases} 2k+1-j, & i = 2j, \quad 1 \leq j \leq 2k ; \\ 6k+1-j, & i = 2j+1, \quad 1 \leq j \leq k-2 ; \\ 6k+2-j, & i = 2j+1, \quad k \leq j \leq 2k-1 ; \\ 2k+1, & i = 4k+1 ; \\ 4k+2, & i = 2k+1 ; \\ 7k+1, & i = 1 . \end{cases}$$

Case 3: $t = 4k+2$, $k \geq 2$, $$x_i = \begin{cases} 2k+1-j, & i = 2j, & 1 \leq j \leq 2k; \\ 6k+3-j, & i = 2j+1, & 1 \leq j \leq k-1; \\ 6k+2-j, & i = 2j+1, & k+1 \leq j \leq 2k; \\ 2k+1, & i = 4k+2; \\ 6k+4, & i = 2k+1; \\ 4k+2, & i = 1. \end{cases}$$

Case 4: $t = 4k+3$, $k \geq 2$, $$x_i = \begin{cases} 2k+2-j, & i = 2j, & 1 \leq j \leq k+1; \\ 6k+5-j, & i = 2j+1, & 1 \leq j \leq k-1; \\ 6k+4-j, & i = 2j+1, & k+1 \leq j \leq 2k; \\ 2k+2, & i = 4k+3; \\ 6k+6, & i = 2k+1; \\ 5k+4, & i = 1. \end{cases}$$

APPENDIX 2

```
main ()
{
    OOC ← empty
        {
            add_set ()          /* try to add a w-set to DP */
            repeat until (failure)
        }
} add_set ()
{
    S ← {0},    count ← 1
        add_element ()    /* try to add an element to S */
        if (success)   count ← 1 + count
        else break out one layer of loop
        repeat until (count = w)
        }
    if (count = w)
        {
            add S to OOC
            report success to invoking program
        }
    else: report failure to invoking program
} add_element ()
{
```

```
set all cflag (•) to zero
for each S' in OOC do
{
    set all diff (•) to zero
    for each (x,y) in S', x≠y, and each z in S,
            increment diff (z+x-y)
    for i with diff(i) ≥ ∅_c, set cflag(i) to one
}
set all aflag(•) to zero
set all diff(•) to zero
for each ordered pair (x,y) in S, x≠y,
        and each z≠y in S, increase diff (z+x-y)
for each i with diff(i) ≥ ∅_a, set aflag(i) to one
Find an element i with cflag(i) = aflag(i) = 0,
        add i to S, and report success
If no such element can be found, report failure
}
```

Remark: All additions and subtractions are done modulo n. Increments are not reduced by modulo n.

APPENDIX 3

The following procedure yields a class of optimizing orthogonal codes for $\emptyset_a = \emptyset_c = 1$ and variable $n$ and $w$. This class is denoted by the notation $\{n,w,s\}$, where $s$ represents the number of sources that may be simultaneously active. The procedure generates codes for given $n$, $w$ and $r$, where $r$ is the number of vectors of length $n$ tested for acceptance as codes; $r = s$ ultimately.

Before presentation of the procedure, certain additional notation is now defined. Given a pulse pattern of K chips, $c_1, c_2, \ldots, c_K$, then the delay between chips $c_i$ and $c_j$ is defined as $|(i-j)|$. The vector representation of a code of K chips in which M are marked to indicate pulses is as follows: the vector has form $\langle e_1, e_2, e_3, \ldots, e_M \rangle$, where $e_i$, for $1 \leq i \leq M - 1$, equals the delay between the $i^{th}$ and $(i+1)^{st}$ marked chip and $e_M$ equals $K - \sum_{i=1}^{M-1} e_i$. With reference to FIG. 3(i), a code is shown comprising three pulses in the 1st, 2nd and 5th chip slots of an 8-chip frame. The vector notation for this code is $\langle 1,3,4 \rangle$.

The procedure for generating the $\{n,w,s\}$ class is as follows:

(1) Construct design matrix $P_1$ of $w \times (w-1)$ rows and $w$ columns whose elements form the following design:

$$P_1 = \begin{bmatrix} 1000 \ldots 00 \\ 0100 \ldots 00 \\ 0010 \ldots 00 \\ \vdots \\ 0000 \ldots 01 \\ 1100 \ldots 00 \\ 0110 \ldots 00 \\ 0011 \ldots 00 \\ \vdots \\ 1000 \ldots 01 \\ 1110 \ldots 00 \\ 0111 \ldots 00 \\ \vdots \\ 1100 \ldots 01 \\ \vdots \\ 1111 \ldots 10 \\ 0111 \ldots 11 \\ \vdots \\ 1111 \ldots 01 \end{bmatrix} \begin{matrix} \left.\vphantom{\begin{matrix}1\\1\\1\\1\end{matrix}}\right\} \text{one "1" per row} \\ \\ \left.\vphantom{\begin{matrix}1\\1\\1\\1\end{matrix}}\right\} \text{two "1"s per row with wrap around effect} \\ \\ \left.\vphantom{\begin{matrix}1\\1\\1\\1\end{matrix}}\right\} \text{three "1"s per row with wrap around effect} \\ \\ \left.\vphantom{\begin{matrix}1\\1\\1\\1\end{matrix}}\right\} \text{w-1 "1"s per row with wrap around effect} \end{matrix}$$

(2) Create a vector $E = \langle e_1, e_2, \ldots, e_w \rangle$ by: first randomly selecting w-1 integers, without replacement, from [1,n-1] whose sum is less than <u>n</u>; then setting the first w-1 entries of E to these integers, and setting entry $$e_w = n - \sum_{i=1}^{w-1} e_i$$

(3) Perform the matrix multiplication $P_1 \times E^T$, where $E^T$ is the transpose of E.

The entries in the resulting vector, when transposed, are referred to as the set of delays associated with E.

(4) If a vector obtained from $P_1 \times E^T$ yields distinct elements, accept E as a code.

(5) Repeat the process of creating E for r-1 more times. After each creation, determine the vector resulting from $P_1 \times E^T$. If the entries in this vector are distinct not only from each other, but from the set of delays associated with codes previously accepted, then accept the resulting E as a code.

(6) Let $\underline{s}$ be the number of r-created vectors which were accepted as codes. The $\underline{s}$ accepted vectors may be used as codes.

Once the $\underline{s}$ vectors are chosen, to obtain the pulse pattern corresponding to each accepted vector E,
(i) mark the first chip to signify a pulse; and
(ii) continue to mark the frame so that the delay between the $j^{th}$ and $(j-1)^{st}$ marked chips is $e_j$, $1 < j \leq w$.

As an example, the procedure is considered for a {13,3,2}-system to demonstrate the procedure.

Step (1): $P_1$ has the following form $$P_1 = \begin{bmatrix} 1 & 0 & 0 \\ 0 & 1 & 0 \\ 0 & 0 & 1 \\ 1 & 1 & 0 \\ 0 & 1 & 1 \\ 1 & 0 & 1 \end{bmatrix}$$

Step (2): the integers 1,3 are randomly selected from the set [1,12]; then $$E_1 = \langle 1, 3, 9 \rangle$$

Step (3): $P_1 \times E_1^T$ yields the vector

<1,3,9,4,12,10>

Step (4): since the elements of the vector in step (3) are distinct, select <1,3,9> as a code (A(0) is a subset of this code).

Step (5)--second iteration of step (2): the integers 2,5 are selected so that $E_2$ = <2,5,6>.

--second iteration of step (3): $P_1 \times E_2^T$ yields the vector <2,5,6,7,11,8>.

--second iteration of step (4): since the elements in the vector <2,5,6,7,11,8> are distinct not only from each other but from the elements of <1,3,9,4,10,12>, accept $E_2$ as a code (B(0) is a subset of this code).

Step (6): Since s = 2 and r = 2 vectors have been accepted as codes, stop the code selection process.

What is claimed is:

1. A method for encoding an input data stream to produce a corresponding output data stream at a given rate, with each data stream comprising zero and non-zero states, said method characterized by the steps of
associating a code word from an optimizing orthongonal code with the input stream, said code selected in correspondence to predetermined transmission characteristics, and
for each non-zero state in the input stream, generating a rate-increased data stream as determined by said code word to represent said each non-zero state in the output stream,
wherein said code is a (n, w, $\phi_a$, $\phi_c$) code C comprising a family of (0,1)-sequences of length n satisfying the following two properties:
(i) the auto-correlation property:

$$\sum_{t=0}^{n-1} x_t x_{t+m} \begin{cases} \leq \phi_a, & \text{for any } X \text{ contained in } C \\ & \text{and } m \text{ an integer,} \\ & 0 < m < n; \\ = w, & \text{for any } X \text{ contained in } C \\ & \text{and } m = 0; \end{cases}$$

(ii) the cross-correlation property:

$$\sum_{t=0}^{n-1} x_t y_{t+m} \leq \phi_c \text{ for any } X \neq Y \text{ contained in } C \text{ and any integer } m;$$

with X and Y being representative code words of C, and X and y representing elements of these code words, with w being the weight of each of said code words, and with $\phi_a$ and $\phi_c$ being the auto-correlation and cross-correlation constraints, respectively.

2. The method as recited in claim 1 wherein the step of generating a rate-increased data stream comprises the steps of subdividing the duration of each said non-zero state into a plurality of chip intervals having an associated chip propagation rate, assigning each chip interval a zero or non-zero state in correspondence to the elements of said code word, and sequentially emitting the assigned chip interval states at said chip rate to form said rate-increased data stream.

3. The method as recited in claim 2 wherein each data stream is composed of binary bits with the logic one level corresponding to said non-zero state.

4. A method for encoding a plurality of input mark-space binary streams to produce a corresponding plurality of output mark-space binary streams, said method characterized by the steps of associating a unique optimizing orthogonal code word from a preselected code with each of the input streams, said code selected in correspondence to predetermined system requirements, and for each mark in each of the input steams, generating a rate-increased binary stream as determined by said associated code word to represent said each mark in the corresponding one of the output streams, wherein said code is a (n, w, $\phi_a$, $\phi_c$) code C comprising a family of (0,1)-sequences of length n satisfying the following two properties:

(i) the auto-correlation property:

$$\sum_{t=0}^{n-1} x_t x_{t+m} \begin{cases} \leq \phi_a, & \text{for any } X \text{ contained in } C \\ & \text{and } m \text{ an integer,} \\ & 0 < m < n; \\ = w, & \text{for any } X \text{ contained in } C \\ & \text{and } m = 0; \end{cases}$$

(ii) the cross-correlation property:

$$\sum_{t=0}^{n-1} x_t y_{t+m} \leq \phi_c \text{ for any } X \neq Y \text{ contained in } C \text{ and any integer } m;$$

with X and Y being representative code words of C, and x and y representing elements of these code words, with w being the weight of each of said code words, and with $\phi_a$ and $\phi_c$ being the auto-correlation and cross-correlation constraints, respectively.

5. A method for encoding a plurality of input binary streams to produce a corresponding plurality of output data streams, said method characterized by the steps of storing a set of optimizing orthogonal code words from a preselected code in an addressable memory and assigning each of said code words to one of said input streams, said set selected in correspondence to predetermined system requirements, and for each binary one in each of the input streams, accessing said memory to identify said assigned code word associated with said each of the input streams and generating a rate-increased binary stream in correspondence to said identified code word as the substitute for said binary one in the corresponding stream from the output streams, wherein said code is a (n, w, $\phi_a$, $\phi_c$) code C comprising a family of (0,1)-sequences of length n satisfying the following two properties:

(i) the auto-correlation property:

$$\sum_{t=0}^{n-1} x_t x_{t+m} \begin{cases} \leq \phi_a, & \text{for any } X \text{ contained in } C \\ & \text{and } m \text{ an integer,} \\ & 0 < m < n; \\ = w, & \text{for any } X \text{ contained in } C \\ & \text{and } m = 0; \end{cases}$$

(ii) the cross-correlation property:

$$\sum_{t=0}^{n-1} x_t y_{t+m} \leq \phi_c \text{ for any } X \neq Y \text{ contained in } C \text{ and any integer } m;$$

with X and Y being representative code words of C, and x and y representing elements of these code words, with w being the weight of each of said code words, and with $\phi_a$ and $\phi_c$ being the auto-correlation and cross-correlation constraints, respectively.

6. A method for communicating information at a given rate between an encoder and decoder as a binary stream transmitted over a path interconnecting the encoder and decoder, said method characterized by the steps of associating a code word from an optimizing orthogonal code with the encoder, said code selected in correspondence to predetermined communication requirements including the number of users coupled to path and the bandwidth of the path, wherein said code is a (n, w, $\phi_a$, $\phi_c$) code C comprising a family of (0,1)-sequences of length n satisfying the following two properties:

(i) the auto-correlation property:

$$\sum_{t=0}^{n-1} x_t x_{t+m} \begin{cases} \leq \phi_a, & \text{for any } X \text{ contained in } C \\ & \text{and } m \text{ an integer,} \\ & 0 < m < n; \\ = w, & \text{for any } X \text{ contained in } C \\ & \text{and } m = 0; \end{cases}$$

(ii) the cross-correlation property:

$$\sum_{t=0}^{n-1} x_t y_{t+m} \leq \phi_c \text{ for any } X \neq Y \text{ contained in } C \text{ and any integer } m;$$

with X and Y being representative code words of C, and x and y representing elements of these code words, with w being the weight of each of said code words, and with $\phi_a$ and $\phi_c$ being the auto-correlation and cross-correlation constraints, respectively, for each binary one received by the encoder, propagating over the path a rate-increased binary stream as determined by said code word, synchronizing the encoder and decoder to the increased rate, and arranging the decoder in energy transfer relation to the path at detection points determined by the code word to produce a detected signal whenever said rate-increased stream is propagating over the path.

7. The method as recited in claim 6 further comprising the step of rate-decreasing said detected signal to provide an output stream at the given rate.

8. In a binary communication system having a plurality of autonomous encoders and decoders connected to a common channel, a method comprising the steps of associating at least one decoder and a code word from an optimizing orthogonal code with each encoder and configuring said at least one decoder according to the code word of its associated encoder, wherein said code is a (n, w, $\phi_a$, $\phi_c$) code C comprising a family of (0,1)-sequences of length n satisfying the following two properties:

(i) the auto-correlation property:

$$\sum_{t=0}^{n-1} x_t x_{t+m} \begin{cases} \leq \phi_a, & \text{for any } X \text{ contained in } C \\ & \text{and } m \text{ an integer,} \\ & 0 < m < n; \\ = w, & \text{for any } X \text{ contained in } C \\ & \text{and } m = 0; \end{cases}$$

(ii) the cross-correlation property:

$$\sum_{t=0}^{n-1} x_t y_{t+m} \leq \phi_c \text{ for any } X \neq Y \text{ contained in } C \text{ and any integer } m;$$

with X and Y being representative code words of C, and x and y representing elements of these code words, with w being the weight of each of said code words, and with $\phi_a$ and $\phi_c$ being the auto-correlation and cross-correlation constraints, respectively, synchronizing said at least one decoder with its associated encoder, for each binary one input arriving asynchronously to each encoder, propagating over the channel a rate-increased data stream as determined by the code word associated with the encoder, and detecting in said at least one decoder said rate-increased data stream to produce a binary one output in correspondence to said each binary one input.

9. In combination, an optical communication path, a source of light pulses, means responsive to an input binary stream for enabling said source to generate light pulses in correspondence to elements of a code word from an optimizing orthogonal code, and means, coupled to said means for enabling, for propagating said pulses as a rate increased output stream onto said path, wherein said code is a (n, w, $\phi_a$, $\phi_c$) code C comprising a family of (0,1)-sequences of length n satisfying the following two properties:

(i) the auto-correlation property:

$$\sum_{t=0}^{n-1} x_t x_{t+m} \begin{cases} \leq \phi_a, & \text{for any } X \text{ contained in } C \\ & \text{and } m \text{ an integer,} \\ & 0 < m < n; \\ = w, & \text{for any } X \text{ contained in } C \\ & \text{and } m = 0; \end{cases}$$

(ii) the cross-correlation property:

$$\sum_{t=0}^{n-1} x_t y_{t+m} \leq \phi_c \text{ for any } X \neq Y \text{ contained in } C \text{ and any integer } m;$$

with X and Y being representative code words of C, and x and y representing elements of these code words, with w being the weight of each of said code words, and with $\phi_a$ and $\phi_c$ being the auto-correlation and cross-correlation constraints, respectively.

10. Circuitry for decoding a rate-increased data stream propagating over a communication path, the stream formed by associating a code word from an optimizing orthogonal code with each binary one in an input data stream and by transmitting a series of pulses during intervals determined by the code word for each binary one in the input stream, said circuitry characterized by means, in energy transfer relation to the path at detection points corresponding to the distribution of elements in the code word, for sensing on the path an array of sensed signals, and means, coupled to said means for sensing, for processing said sensed signals and for providing a decoded signal whenever a series of pulses corresponding to the code word propagates along the path, wherein said code is a (n, w, $\phi_a$, $\phi_c$) code C comprising a family of (0,1)-sequences of length n satisfying the following two properties:

(i) the auto-correlation property:

$$\sum_{t=0}^{n-1} x_t x_{t+m} \begin{cases} \leq \phi_a, & \text{for any } X \text{ contained in } C \\ & \text{and } m \text{ an integer,} \\ & 0 < m < n; \\ = w, & \text{for any } X \text{ contained in } C \\ & \text{and } m = 0; \end{cases}$$

(ii) the cross-correlation property:

$$\sum_{t=0}^{n-1} x_t y_{t+m} \leq \phi_c \text{ for any } X \neq Y \text{ contained in } C \text{ and any integer } m;$$

with X and Y being representative code words of C, and x and y representing elements of these code words, with w being the weight of each of said code words, and with $\phi_a$ and $\phi_c$ being the auto-correlation and cross-correlation constraints, respectively.

11. The circuitry recited in claim 10 wherein said means for processing includes means for synchronizing to said rate-increased rate.

12. A system for transmitting information from a plurality of electrical sources over a common optical channel comprising an electro-optical encoder connected to each of said sources, each of said encoders comprising means for generating a unique pattern of rate-increased optical pulses for each corresponding electrical pulse from its connected electrical source, said unique pattern selected in correspondence to one code word of an optimizing orthogonal code, wherein said code is a (n, w, $\phi_a$, $\phi_c$) code C comprising a family of (0,1)-sequences of length n satisfying the following two properties:
(i) the auto-correlation property:

$$\sum_{t=0}^{n-1} x_t x_{t+m} \begin{cases} \leq \phi_a, & \text{for any } X \text{ contained in } C \\ & \text{and } m \text{ an integer,} \\ & 0 < m < n; \\ = w, & \text{for any } X \text{ contained in } C \\ & \text{and } m = 0; \end{cases}$$

(ii) the cross-correlation property:

$$\sum_{t=0}^{n-1} x_t y_{t+m} \leq \phi_c \text{ for any } X \neq Y \text{ contained in } C \text{ and any integer } m;$$

with X and Y being representative code words of C, and x and y representing elements of these code words, with w being the weight of each of said code words, and with $\phi_a$ and $\phi_c$ being the auto-correlation and cross-correlation constraints, respectively.

13. A method for communicating between an encoder and a decoder a rate-increased binary stream characterized by the steps of
forming the stream in the encoder by associating a code word from an optimizing orthogonal code with each binary one in a corresponding input stream received by the encoder and by transmitting a series of pulses during intervals determined by the code word for each binary one in the input stream over a path connecting the encoder and decoder,
wherein said code is a (n, w, $\phi_a$, $\phi_c$) code C comprising a family of (0,1)-sequences of length n satisfying the following two properties:
(i) the auto-correlation property:

$$\sum_{t=0}^{n-1} x_t x_{t+m} \begin{cases} \leq \phi_a, & \text{for any } X \text{ contained in } C \\ & \text{and } m \text{ an integer,} \\ & 0 < m < n; \\ = w, & \text{for any } X \text{ contained in } C \\ & \text{and } m = 0; \end{cases}$$

(ii) the cross-correlation property:

$$\sum_{t=0}^{n-1} x_t y_{t+m} \leq \phi_c \text{ for any } X \neq Y \text{ contained in } C \text{ and any integer } m;$$

with X and Y being representative code words of C, and x and y representing elements of these code words, with w being the weight of each of said code words, and with $\phi_a$ and $\phi_c$ being the auto-correlation and cross-correlation constraints, respectively,
synchronizing the encoder and the decoder at the increased rate,
arranging a sensor array in energy transfer relation to said path at detection points determined by said code word, and
processing the output of said sensor array to produce a decoded signal whenever a series of pulses corresponding the said code word is propagated along said path.

14. The method as recited in claim 13 wherein the step of processing includes the step of enabling said sensor array for preselected durations in correspondence to said intervals.

15. The method as recited in claim 13 wherein the step of arranging a sensor array in energy transfer relation comprises the step of coupling energy detectors to said path at said detection points.

16. The method as recited in claim 13 wherein said path comprises a fiber optic cable, wherein the step of arranging a sensor array in energy transfer relation to said path includes the steps of
tapping electro-optical energy from said cable at said detection points, and
feeding said electro-optical energy to a photo-detector arrangement to provide a received signal as said output of said sensor array, and wherein said step of processing includes the steps of
threshold detecting said received signal to produce a threshold signal, and
generating said docoded signal whenever said threshold signal is above a predetermined threshold.

* * * * *

UNITED STATES PATENT AND TRADEMARK OFFICE
CERTIFICATE OF CORRECTION

PATENT NO. : 4,779,266

DATED : October 18, 1988

INVENTOR(S) : Chung-Kerner-O'Connor-Selehi-Wei

It is certified that error appears in the above-identified patent and that said Letters Patent is hereby corrected as shown below:

Column 2, line 15, after "is" insert --generally quite complex and a substantial portion of--;

Column 2, line 16, after "reducing" insert --throughput.--;

Column 2, line 21, change "dignal" to --signal--.

Column 5, line 31, change " '2' " to --'1'--;

Column 5, line 33, change " '2' " to -- '1' --.

Column 6, line 6, change "A A" to --A⊠A--.

Column 26, line 61, change "docoded" to --decoded--.

Signed and Sealed this

Eighth Day of September, 1992

*Attest:*

DOUGLAS B. COMER

*Attesting Officer*  *Acting Commissioner of Patents and Trademarks*